(12) United States Patent
Ohyama

(10) Patent No.: US 9,832,740 B2
(45) Date of Patent: Nov. 28, 2017

(54) APPARATUS AND METHOD FOR CORRECTING TRANSMIT POWER BASED ON RECEIVED SIGNAL STRENGTH FROM A BASE STATION

(71) Applicant: FUJITSU LIMITED, Kawasaki-shi, Kanagawa (JP)

(72) Inventor: Junichi Ohyama, Tagajou (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/966,991

(22) Filed: Dec. 11, 2015

(65) Prior Publication Data

US 2016/0198415 A1 Jul. 7, 2016

(30) Foreign Application Priority Data

Jan. 5, 2015 (JP) ................. 2015-000099

(51) Int. Cl.
*H04W 52/24* (2009.01)
*H04W 52/38* (2009.01)
*H04B 17/318* (2015.01)

(52) U.S. Cl.
CPC ........ *H04W 52/245* (2013.01); *H04B 17/318* (2015.01); *H04W 52/386* (2013.01)

(58) Field of Classification Search
CPC ... H04W 52/08; H04W 52/146; H04W 28/06; H04W 52/143; H04W 52/225; H04W 72/04; H04W 88/08
See application file for complete search history.

(56) References Cited

U.S. PATENT DOCUMENTS

| | | | |
|---|---|---|---|
| 5,802,110 A | 9/1998 | Watanabe et al. | |
| 6,389,265 B1* | 5/2002 | Jeschke | H04W 52/40 455/453 |
| 6,493,541 B1* | 12/2002 | Gunnarsson | H04W 52/223 375/346 |
| 6,542,483 B1* | 4/2003 | Dinc | H04W 52/267 370/332 |
| 7,454,174 B2* | 11/2008 | Stein | H04B 17/382 455/453 |
| 8,229,494 B1* | 7/2012 | Kela | H04W 52/146 455/522 |
| 2002/0077113 A1* | 6/2002 | Spaling | H04W 24/08 455/453 |
| 2002/0160800 A1* | 10/2002 | Rozmaryn | H03M 7/30 455/522 |
| 2006/0126755 A1 | 6/2006 | Itou | |
| 2012/0282970 A1* | 11/2012 | Kela | H04W 52/146 455/522 |
| 2014/0045544 A1 | 2/2014 | Ohyama | |

(Continued)

FOREIGN PATENT DOCUMENTS

| | | |
|---|---|---|
| JP | 08-168075 A | 6/1996 |
| JP | 2006-173937 A | 6/2006 |

(Continued)

*Primary Examiner* — Bobbak Safaipour
(74) *Attorney, Agent, or Firm* — Arent Fox LLP

(57) ABSTRACT

A wireless device receives transmit power control information from a base station, and detects a received signal strength of a wireless signal from the base station. The wireless device corrects a transmit power control amount indicated by the transmit power control information, based on the detected received signal strength.

9 Claims, 9 Drawing Sheets

(56) References Cited

U.S. PATENT DOCUMENTS

| | | | |
|---|---|---|---|
| 2014/0220905 A1* | 8/2014 | Buckley | H04W 52/367 455/69 |
| 2016/0105886 A1* | 4/2016 | Li | H04W 4/005 370/329 |

FOREIGN PATENT DOCUMENTS

| | | |
|---|---|---|
| JP | 2006-287489 A | 10/2006 |
| JP | 2014-036272 A | 2/2014 |

* cited by examiner

| TA VALUE | POWER THRESHOLD |
|---|---|
| 0 - 2564 | -25 dBm |
| 2565 - 5128 | -20 dBm |
| 5129 - 7692 | -15 dBm |
| 7693 - 10256 | -10 dBm |
| 10257 - 12820 | -5 dBm |
| 12821 - 15384 | 0 dBm |
| 15385 - 17948 | +5 dBm |
| 17949 - 20512 | +10 dBm |

APPARATUS AND METHOD FOR CORRECTING TRANSMIT POWER BASED ON RECEIVED SIGNAL STRENGTH FROM A BASE STATION

CROSS-REFERENCE TO RELATED APPLICATION

This application is based upon and claims the benefit of priority of the prior Japanese Patent Application No. 2015-000099, filed on Jan. 5, 2015, the entire contents of which are incorporated herein by reference.

FIELD

The embodiment discussed herein is related to apparatus and method for correcting transmit power based on received signal strength from a base station.

BACKGROUND

Wireless communication systems including base stations and wireless devices are known (refer to, for example, Japanese Laid-open Patent Publication No. 2014-36272, Japanese Laid-open Patent Publication No. 2006-287489, Japanese Laid-open Patent Publication No. 8-168075, and Japanese Laid-open Patent Publication No. 2006-173937). A wireless communication system corrects a transmit power control amount indicated by transmit power control information, based on timing advance (TA) information for controlling the timing of transmission of a wireless signal. The TA information includes an instruction that controls a transmission timing such that the longer it takes for a wireless signal to propagate from a wireless device to a base station, the earlier the transmission timing.

SUMMARY

According to an aspect of the invention, an apparatus receives transmit power control information from a base station, and detects a received signal strength of a wireless signal from the base station. The apparatus corrects a transmit power control amount indicated by the transmit power control information, based on the detected received signal strength.

The object and advantages of the invention will be realised and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

TA information is obtained in such a way that, after a received wireless signal is demodulated and decoded, a process in accordance with a communication protocol called medium access control (MAC) is performed on the decoded signal. Accordingly, the period of time taken after a signal containing TA information is received until the TA information is obtained is likely to be long. Therefore, in the wireless device mentioned above, correction of a transmit power control amount is likely to be delayed. This results in an unnecessarily large transmit power, causing the power consumed (power consumption) by a wireless device to become excessive in some cases.

Figure 1:
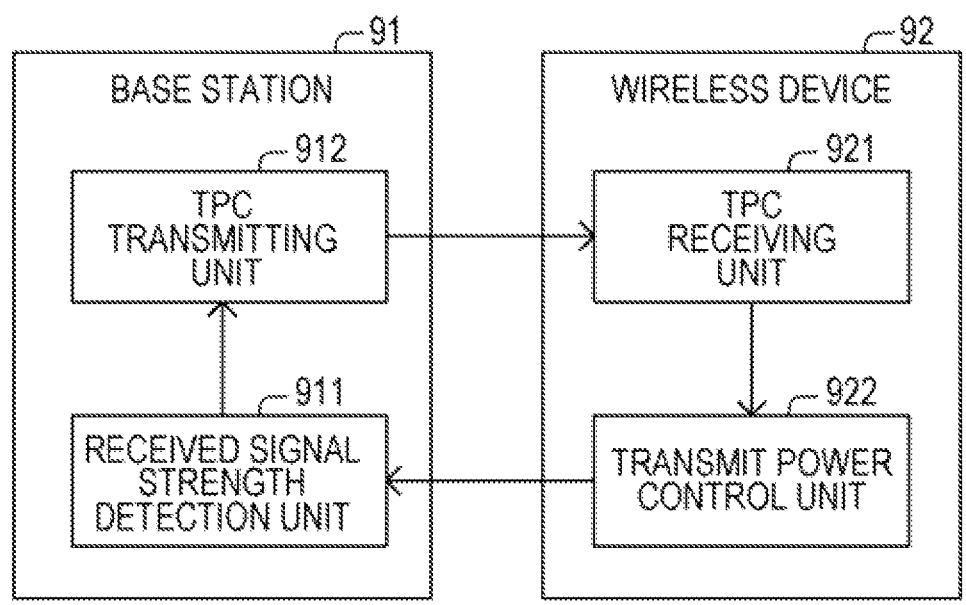
FIG. 1 is a diagram illustrating an example of transmit power control.

As illustrated in FIG. 1, a base station 91 receives a wireless signal transmitted by a wireless device 92 and, using a received signal strength detection unit 911, detects the strength of the received wireless signal (in other words, received signal strength).

When the detected received signal strength is smaller than or equal to a given threshold, the base station 91, using a TPC transmitting unit 912, transmits a TPC command, which indicates a transmit power control amount representing an increase in transmit power, to the wireless device 92. TPC is an abbreviation of Transmit Power Control. On the other hand, when the detected received signal strength is larger than the above threshold, the base station 91, using the TPC transmitting unit 912, transmits a TPC command, which indicates a transmit power control amount representing a decrease in transmit power, to the wireless device 92.

The wireless device 92 receives a TPC command transmitted by the base station 91, using a TPC receiving unit 921. The wireless device 92 varies the transmit power of a wireless signal in the uplink by the transmit power control amount indicated by the TPC command, using a transmit power control unit 922.

The lower the quality of communication between the base station 91 and the wireless device 92, the higher the probability that the wireless device 92 is not able to properly receive a TPC command transmitted from the base station 91. Additionally, when the quality of communication between the base station 91 and the wireless device 92 has rapidly varied, a TPC command transmitted by the base station 91 does not reflect the latest communication quality in some cases.

Consequently, when having varied transmit power by a transmit power control amount indicated by a TPC command, the wireless device 92 is not able to suitably control the transmit power in some cases. In such cases, the transmit power becoming unnecessarily large sometimes results in that the wireless device 92 wastes power. In such cases, the transmit power of wireless signals in the uplink is sometimes not able to be controlled to have a suitable value in accordance with the quality of communication between the base station 91 and the wireless device 92.

Therefore, in an embodiment, based on the received signal strength of a wireless signal from a base station, the transmit power control amount indicated by transmit power control information is corrected. This may reduce the power consumption of the wireless device. This also may correct the transmit power control amount more quickly than in the case where, based on TA information, the transmit power control amount indicated by transmit power control information is corrected. Accordingly, an increase in transmit power may be suppressed early on. As a result, the power consumption of a wireless device may be reduced.

Hereinafter, an embodiment of the disclosure will be described with reference to the accompanying drawings. However, the embodiment described below is an illustrative example. Accordingly, it is not excluded that various modifications and techniques not explicitly described below are applied to the embodiment. It is to be noted that, in the drawings used in the embodiment described below, portions denoted by the same reference numerals represent the same or similar portions unless changes or modifications are explicitly described.

Embodiment (Configuration)

Figure 2:
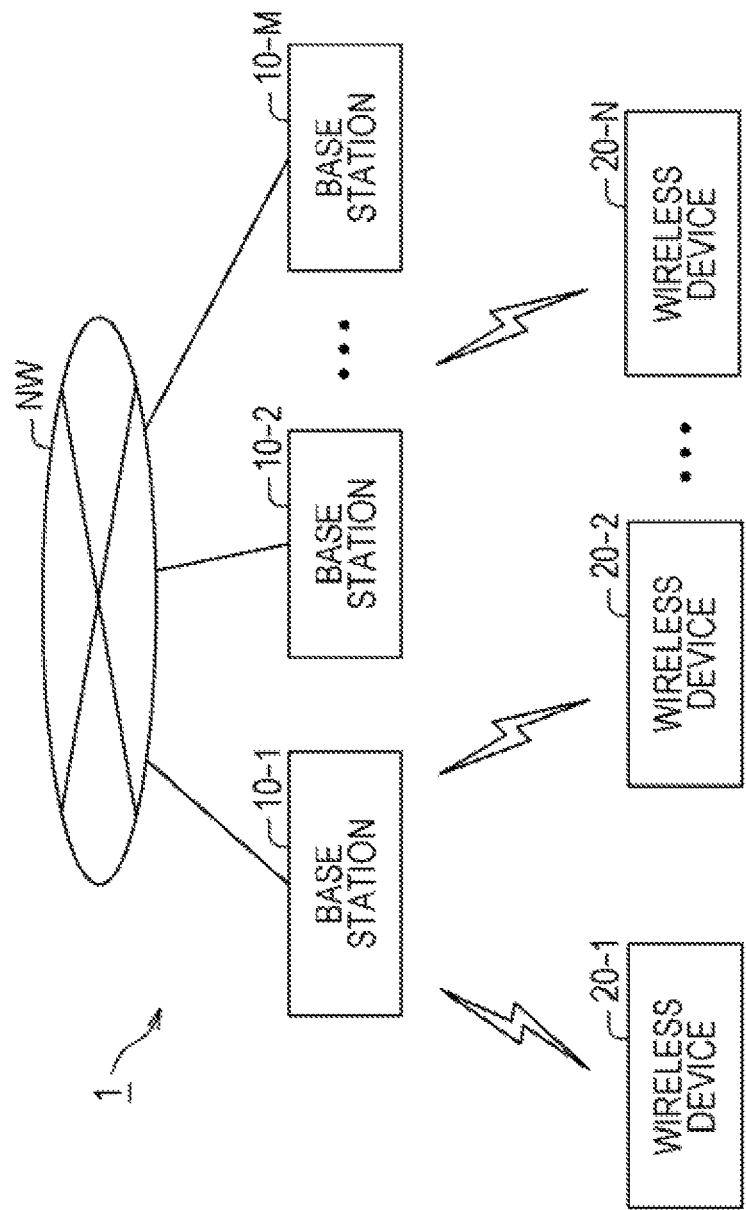
FIG. 2 is a diagram illustrating an example of a configuration of a wireless communication system, according to an embodiment.

As illustrated in FIG. 2, a wireless communication system 1 according to the embodiment includes, by way of example, M base stations 10-1, 10-2, . . . , 10-M and N wireless devices 20-1, 20-2, . . . , 20-N.

In this example, M denotes an integer of one or more. Hereinafter, base stations 10-*m* are also referred to as base stations 10 when the base stations 10-*m* do not have to be distinguished from one another. The m denotes an integer from one to M. In the example, N denotes an integer of one or more. Hereinafter, wireless devices 20-*n* are also referred to as wireless devices 20 when the wireless devices 20-*n* do not have to be distinguished from one another. The n denotes an integer from one to N.

The wireless communication system 1 performs wireless communication in accordance with a given wireless communication technology between the base stations 10 and the wireless device 20. For example, the wireless communication technology is the LTE technology. LTE is an abbreviation of Long Term Evolution. Note that the wireless communication technology may be a technology (such as the technology of the LTE-Advanced, WiMAX, or the like) different from the LTE technology. WiMAX is an abbreviation of Worldwide Interoperability for Microwave Access.

Each base station 10 covers a wireless area. Note that each base station 10 may cover a plurality of wireless areas. The wireless area may be also referred to as a coverage area or a communication area. For example, the wireless area may be referred to as a cell such as a macrocell, a microcell, a nanocell, a picocell, a femtocell, a home cell, a small cell, or a sector cell. Each base station 10-*m* wirelessly communicates with the wireless device 20 located within a wireless area covered by the base station 10-*m*.

Each base station 10 is communicatively coupled to a communication network (for example, a core network) NW via a communication line. An interface between the base station 10 and the communication network NW may be referred to as an S1 interface. An interface between the base stations 10 may be referred to as an X2 interface.

The part on the side of the communication network (that is, the upper layer) NW relative to the base stations 10 of the wireless communication system 1 may be referred to as EPC. EPC is an abbreviation of Evolved Packet Core. The part composed of the base stations 10 in the wireless communication system 1 may be referred to as E-UTRAN. E-UTRAN is an abbreviation of Evolved Universal Terrestrial Radio Access Network.

Each wireless device 20-*n* uses wireless resources provided in a wireless area, where the wireless device 20-*n* is located, to wirelessly communicate with the base station 10 that covers that wireless area. Note that the wireless device 20 may be referred to as a wireless terminal, a wireless device, a mobile station, a mobile terminal, a terminal device, or user equipment (UE). For example, the wireless device 20 is a mobile phone, a smart phone, a sensor, a meter (measuring instrument), or the like. The wireless device 20 may be carried by the user, may be mounted on a movable object such as a vehicle, or may be fixed.

In the example, a wireless signal transmitted from the base station 10 to the wireless device 20 is referred to as a wireless signal in the downlink. In the example, a wireless signal transmitted from the wireless device 20 to the base station 10 is referred to as a wireless signal in the uplink.

Figure 3:
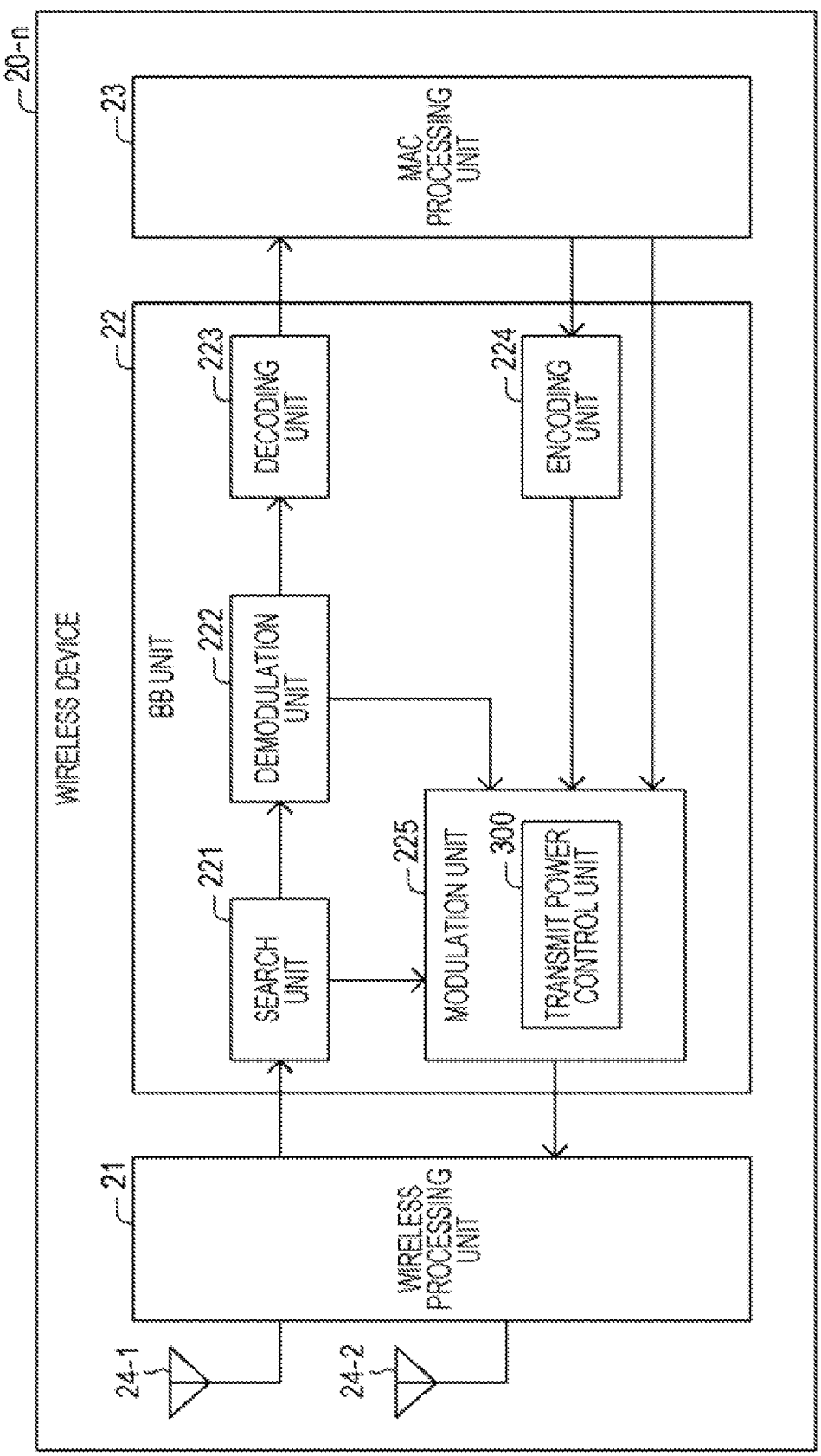
FIG. 3 is a diagram illustrating an example of a configuration of a wireless device, according to an embodiment.

As illustrated in FIG. 3, the wireless device 20-*n* includes, by way of example, a wireless processing unit 21, a BB unit 22, a MAC processing unit 23, and a plurality of (two in the example) antennas 24-1 and 24-2. BB is an abbreviation of Baseband. MAC is an abbreviation of Medium Access Control. Note that the number of antennas included in the wireless device 20-*n* may be one or three or more.

The wireless processing unit 21 receives signals wirelessly transmitted from the base station 10 via the antennas 24-1 and 24-2. The wireless processing unit 21 frequency-converts (here, down-converts) the received signals. A signal after conversion may be referred as a BB signal. The wireless processing unit 21 outputs the BB signal to the 88 unit 22.

A BB signal is input from the BB unit 22 to the wireless processing unit 21. The wireless processing unit 21 frequency-converts (here, up-converts) the input BB signal. Additionally, a transmit power value is input from the BB unit 22 to the wireless processing unit 21. The wireless processing unit 21 amplifies the frequency-converted signal so that the transmit power of a wireless signal to be transmitted has the same value as the input transmit power value, and transmits the amplified signal via the antennas 24-1 and 24-2 to the base station 10.

The BB unit 22 includes a search unit 221, a demodulation unit 222, a decoding unit 223, an encoding unit 224, and a modulation unit 225.

A BB signal is input from the wireless processing unit 21 to the search unit 221. The search unit 221 identifies, based on the input BB signal, the base station 10 with which the search unit 221 is to communicate. Additionally, the search unit 221 performs, based on the input BB signal, detection of paths and path timings and other processing.

In addition, the search unit 221 detects the strength of a wireless signal received (in other words, the received signal strength) by the wireless device 20-n, based on the input BB signal, and outputs the detected received signal strength to the modulation unit 225. In the example, the received signal strength is detected for each subframe. In the example, each subframe is an element having a given length of time (1 ms in the example) of a wireless signal. The search unit 221 is an example of a detection unit that detects the strength of a wireless signal from the base station 10.

Additionally, the search unit 221 outputs the input BB signal to the demodulation unit 222.

A BB signal is input from the search unit 221 to the demodulation unit 222. The demodulation unit 222 demodulates the input BB signal. The demodulation unit 222 outputs the demodulated BB signal to the decoding unit 223. The demodulation unit 222 obtains a TPC command from the demodulated BB signal and outputs the obtained TPC command to the modulation unit 225. The TPC command may be transmitted through a control channel.

In the example, a TPC command is transmitted for each subframe. In the example, a TPC command contains a TPC value. For example, the TPC value is one bit information. The TPC value is an example of transmit power control information indicating a transmit power control amount. The demodulation unit 222 is an example of a receiving unit that receives transmit power control information from the base station 10.

A BB signal is input from the demodulation unit 222 to the decoding unit 223. The decoding unit 223 performs a decoding process on the input BB signal. The decoding unit 223 outputs the 88 signal after the process to the MAC processing unit 23.

A BB signal is input from the MAC processing unit 23 to the encoding unit 224. The encoding unit 224 performs an encoding process on the input BB signal. The encoding unit 224 outputs the BB signal after the process to the modulation unit 225.

A TPC command is input from the demodulation unit 222 to the modulation unit 225. Additionally, timing advance (TA) information is input from the MAC processing unit 23 to the modulation unit 225 as described below. The TA information is information that controls a timing at which a wireless signal is transmittal (in other words, a transmission timing). In the example, the TA information includes an instruction that controls transmission timing such that the longer it takes for a wireless signal to propagate from the wireless device 20 to the base station 10, the earlier the transmission timing. The TA information may be referred to as transmission timing control information.

A BB signal is input from the encoding unit 224 to the modulation unit 225. The modulation unit 225 modulates the input BB signal. The modulation unit 225 outputs the modulated BB signal to the wireless processing unit 21 so that the timing at which a wireless signal is transmitted by the wireless processing unit 21 is adjusted to a timing based on the input TA information.

The modulation unit 225 includes a transmit power control unit 300. The transmit power control unit 300 determines a transmit power value, using a received signal strength, a TPC command, and TA information input to the modulation unit 225, and outputs the determined transmit power value to the wireless processing unit 21. The transmit power control unit 300 is an example of a control unit that corrects, based on a received signal strength, a transmit power control amount indicated by transmit power control information. The transmit power control unit 300 will be described below.

A BB signal is input from the decoding unit 223 to the MAC processing unit 23. The MAC processing unit 23 performs a process in the MAC layer on the input BB signal. For example, the process in the MAC layer includes a process for the header of a frame, according to MAC. The MAC processing unit 23 outputs data after the process. For example, the output data may be subjected to a process in an upper layer and then be output to the user of the wireless device 20.

Additionally, in the example, the MAC processing unit 23 obtains TA information from the input BB signal and outputs the acquired TA information to the modulation unit 225.

Data is input to the MAC processing unit 23. For example, the data may be data obtained after a process in an upper layer is performed on data entered by the user of the wireless device 20. The MAC processing unit 23 performs a process in the MAC layer on the input data to generate a BB signal and outputs the generated 88 signal to the encoding unit 224.

The transmit power control unit 300 will be described in more detail.

Figure 4:
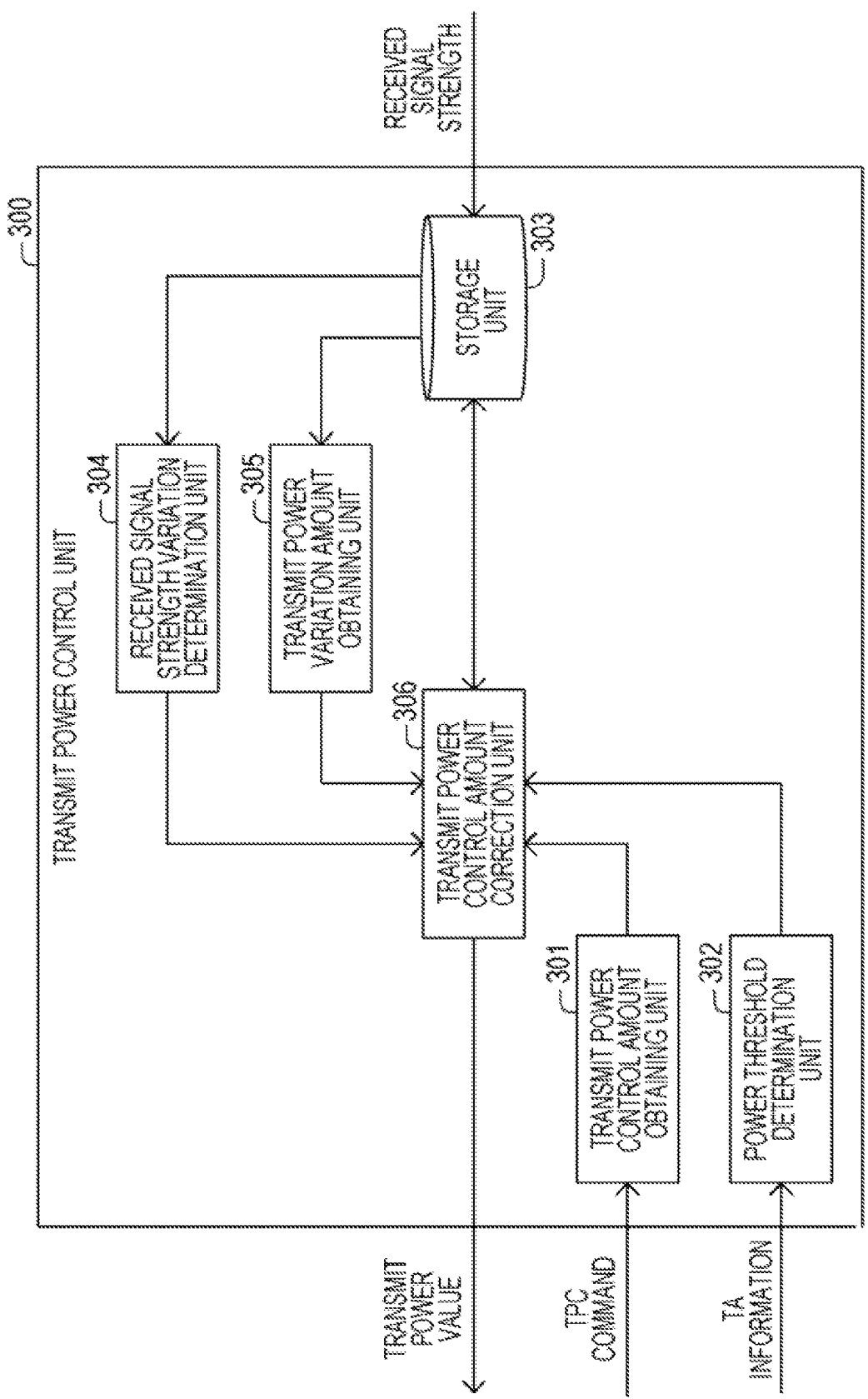
FIG. 4 is a diagram illustrating an example of a configuration of a transmit power control unit, according to an embodiment.

As illustrated in FIG. 4, the transmit power control unit 300 includes a transmit power control amount obtaining unit 301, a power threshold determination unit 302, a storage unit 303, a received signal strength variation determination unit 304, a transmit power variation amount obtaining unit 305, and a transmit power control amount correction unit 306.

The transmit power control amount obtaining unit 301 obtains a TPC value contained in a TPC command input from the demodulation unit 222 and, based on the obtained TPC value, obtains a transmit power control amount. In the example, the transmit power control amount is measured in units of dBm.

In the example, the transmit power control amount obtaining unit 301 stores in advance information associating TPC values with transmit power control amounts. In the example, the transmit power control amount obtaining unit 301 stores information associating "0" as a TPC value with "−1" as a transmit power control amount and information associating "1" as a TPC value with "+1" as a transmit power control amount.

Consequently, when a TPC value is "0", the TPC value indicates that the transmit power control amount is "−1 dBm". Additionally, when a TPC value is "1", the TPC value indicates that the transmit power control amount is "+1 dBm".

The transmit power control amount obtaining unit 301 outputs the obtained transmit power control amount to the transmit power control amount correction unit 306.

The power threshold determination unit 302 determines a power threshold based on TA information input from the MAC processing unit 23 and outputs the determined power threshold to the transmit power control amount correction unit 306. In the example, upon each passage of a given decision cycle, a power threshold is determined and the power threshold is output. For example, die decision cycle is a period of time corresponding to a plurality of (for example, several to several tens of) subframes.

In the example, TA information contains a TA value. In the example, a TA value has a positive integer. In the example, the larger a TA value, the earlier the transmission timing indicated by the TA value. In the example, it may be understood that a larger TA value indicates a longer distance between the base station 10 and the wireless device 20. It may also be understood that a larger TA value indicates a longer period of time taken for a wireless signal to propagate from the wireless device 20 to the base station 10.

Figures 5, 6:
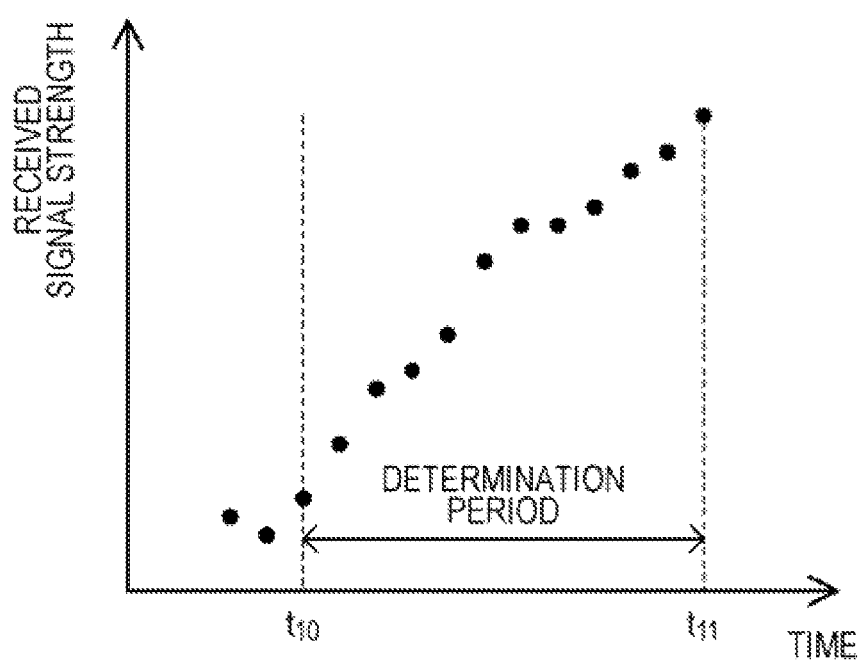
FIG. 5 is a diagram illustrating an example of a table depicting information associating TA values with power thresholds, which is stored in a transmit power control unit, according to an embodiment.
FIG. 6 is a diagram illustrating an example of a graph depicting variations in received signal strength in a determination period, according to an embodiment.

As illustrated in FIG. 5, the power threshold determination unit 302 stores in advance information associating TA values with power thresholds. In the example, the power threshold in information stored by the power threshold determination unit 302 increases as the TA value associated with the power threshold increases. For example, the power threshold determination unit 302 stores information including information that associates "0" as the minimum value of the TA value with "−25 dBm" as a power threshold and information that associates "20512" as the maximum value of the TA value with "+10 dBm" as a power threshold.

Note that information associating TA values with power thresholds may be changed based on information entered by the user of the wireless device 20 or information received from the base station 10.

In the example, a power threshold is determined based on information stored by the power threshold determination unit 302 and a TA value contained in TA information input from the MAC processing unit 23 to the power threshold determination unit 302.

Note that the transmit power control unit 300 may store a given power threshold in advance and, instead of determining a power threshold based on TA information, use the stored power threshold without being based on the TA information. In this case, the transmit power control unit 300 may exclude the power threshold extermination unit 302.

Each time a received signal strength is input from the search unit 221, the storage unit 303 stores information associating the input received signal strength with a point in time at which the received signal strength is detected. Additionally, each time a transmit power value is output by the transmit power control amount correction unit 308 as described below, the storage unit 303 stores information associating the output transmit power value with a point in time at which transmit power is controlled to the transmit power value.

Based on the information associating received signal strengths with points in time at which the received signal strengths were detected, which is stored m the storage unit 303, the received signal strength variation determination unit 304 determines whether or not the received signal strength has increased in a determination period. In the example, the determination period is a period between a point in time at which the above determination is carried out and a point in time that precedes that point in time by a given period of time for determination. For example, the period of time for determination may be set so as to synchronize with a subframe. In the example, the period of time for determination is a period of time corresponding to several to several tens of subframes. For example, the period of time for determination may be a period of time between 5 ms to 30 ms.

In the example, when, as illustrated in FIG. 6, the received signal strength has monotonously increased in a determination period from a point in time $t_{10}$ to a point in time $t_{11}$, the received signal strength variation determination unit 304 determines mat the received signal strength has increased in the determination period. In the example, when the received signal strength has not monotonously increased in a determination period, the received signal strength variation determination unit 304 determines that the received signal strength has not increased in the determination period.

Figure 7:
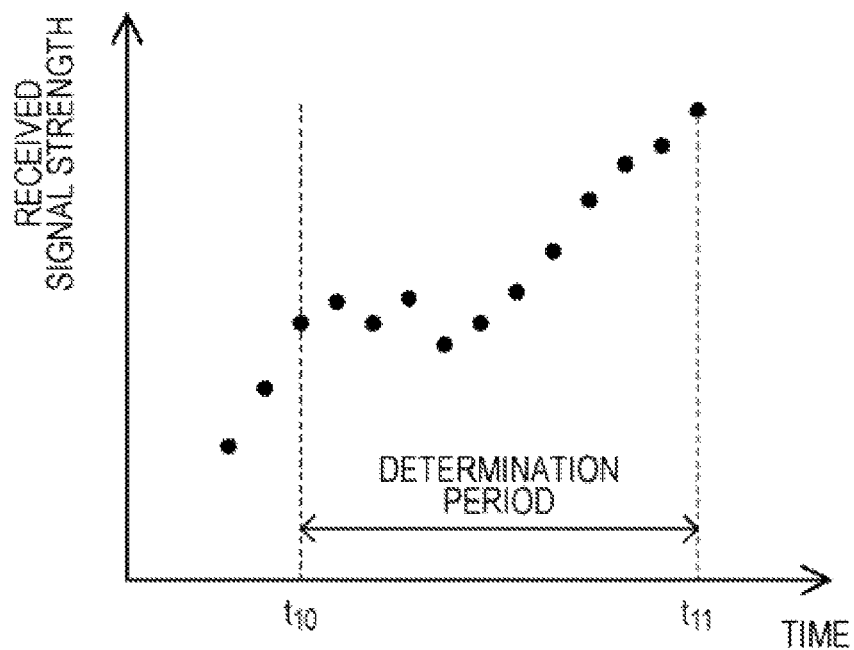
FIG. 7 is a diagram illustrating an example of variations in received signal strength in a determination period, according to an embodiment.

Note that when, as illustrated in FIG. 7, the received signal strength at the point in time $t_{11}$, at which the determination period ends, is larger than the received signal strength at the point in time $t_{10}$, at which the determination period starts, the received signal strength variation determination unit 304 may determine that the received signal strength has increased in the determination period. In this case, when the received signal strength at the point in time, at which the determination period ends, is lower than or equal to the received signal strength at the point in time, at which the determination period starts, the received signal strength variation determination unit 304 may determine that the received signal strength has not increased in the determination period.

Figure 8:
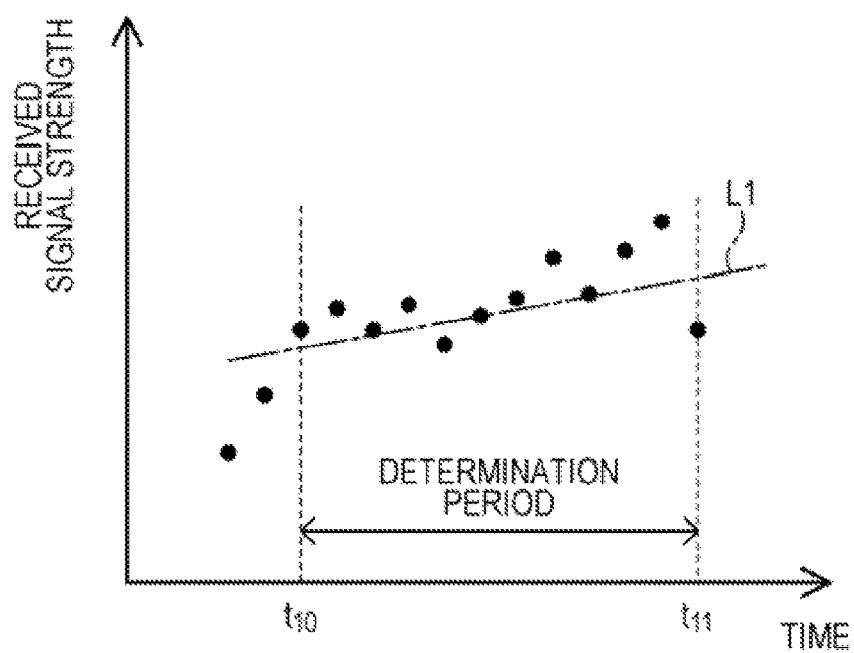
FIG. 8 is a diagram illustrating an example of variations in received signal strength in a determination period, according to an embodiment.

When, as illustrated in FIG. 8, the slope of a straight line L1 that approximates received signal strengths in a determination period (in other words, an approximate straight line) has a positive value, the received signal strength variation determination unit 304 may determine that the received signal strength has increased in the determination period. For example, the received signal strength variation determination unit 304 may compute the slope of an approximate straight line using a least squares method. In this case, when the slope of a straight line that approximates received signal strengths in the determination period is smaller than or equal to zero, the received signal strength variation determination unit 304 may determine that the received signal strength has not increased in the determination period.

For example, it may be understood that an increased received signal strength indicates a higher quality of communication between the base station 10 and the wireless device 20. It may also be understood that an increased received signal strength indicates a better state of communication channels or propagation paths between the base station 10 and the wireless device 20. It may also be understood that an increased received signal strength indicates a shorter distance between the base station 10 and the wireless device 20.

The received signal strength variation determination unit 304 outputs a result of the determination mentioned above to the transmit power control amount correction unit 306.

The transmit power variation amount obtaining unit 305 obtains an amount of variation in transmit power value (in other words, a transmit power variation amount) in a determination period, based on information associating transmit power values with points in time at which transmit powers were controlled to the transmit power values, which is stored in the storage unit 303. In the example, the transmit power variation amount obtaining unit 305 obtains a value calculated by subtracting the transmit power value at a point in time at which a determination period starts from the transmit power value at a point in time at which the determination period ends, as a transmit power variation amount in the determination period.

The transmit power variation amount obtaining unit 305 outputs the obtained transmit power variation amount to the transmit power control amount correction unit 306.

In the example, the transmit power control amount correction unit 306 corrects a transmit power control amount input from the transmit power control amount obtaining unit 301 when all the first to fourth conditions mentioned below are met.

The first condition is that the transmit power control amount input from the transmit power control amount obtaining unit 301 to the transmit power control amount correction unit 306 be a positive value. In other words, the first condition is that a TPC command instructs an increase in transmit power.

The second condition is that the transmit power variation amount input from the transmit power variation amount obtaining unit 305 be larger than a predetermined variation amount threshold. In the example, the variation amount threshold is stored in advance by the transmit power control amount correction unit 306. Note that the variation amount threshold may be changed based on information entered by the user of the wireless device 20 or information received from the base station 10.

The third condition is that the transmit power value being used for control of transmit power be larger than a power threshold input from the power threshold determination unit 302. In the example, the transmit power value being used for control of transmit power is a transmit power value being used for control of transmit power at a point in time at which it is determined whether or not the first to fourth conditions are met.

The fourth condition is that the received signal strength has increased in a determination period. In the example, as described above, whether or not the fourth condition is met is determined by the received signal strength determination unit 304.

The transmit power control amount after correction may be referred to as a corrected control amount. In the example, the corrected control amount is a value calculated by multiplying an instructed control amount by a given correction coefficient. The instructed control amount is a transmit power control amount input from the transmit power control amount obtaining unit 301 to the transmit power control amount correction unit 306. The transmit power control amount correction unit 306 stores the correction coefficient in advance. In the example, the correction coefficient is smaller than one. For example, the correction coefficient is 0.25 or 0.5. Note that the correction coefficient may have a value of zero or a negative value.

In the example, the corrected control amount is smaller than the instructed control amount. In other words, correction of a transmit power control amount performed by the transmit power control amount correction unit 306 decreases the transmit power control amount indicated by transmit power control information.

Note that the correction coefficient may be changed based on information entered by the user of the wireless device 20 or information received from the base station 10. The transmit power control amount correction unit 306 may correct the transmit power control amount by storing in advance a corrected control amount smaller than the instructed control amount, instead of the correction coefficient, and replacing the instructed control amount with the stored corrected control amount, instead of the correction based on the correction coefficient.

When all the above first to fourth conditions are met, the transmit power control amount correction unit 306 outputs a value calculated by adding a corrected control amount to the transmit power value being used for control of transmit power, as a transmit power value, to the wireless processing unit 21. In other words, in this case, the transmit power control amount correction unit 306 corrects the transmit power control amount indicated by a TPC value, which is transmit power control information, changes the transmit power value by the corrected transmit power control amount, and outputs the changed transmit power value.

On the other hand, when at least one of the above first to fourth conditions is not met, the transmit power control amount correction unit 306 outputs a value calculated by adding an instructed control amount to the transmit power value being used for control of transmit power, as a transmit power value, to the wireless processing unit 21. In other words, in this case, the transmit power control amount correction unit 306 does not correct the transmit power control amount indicated by a TPC value, which is transmit power control information, changes the transmit power value by the transmit power control amount concerned, and outputs the changed transmit power value.

Note that when at least one of die above second to fourth conditions and the above first condition are met, the transmit power control amount correction unit 306 may correct a transmit power control amount input from the transmit power control amount obtaining unit 301. For example, when given two conditions among the above second to fourth conditions, and the above first condition, are met, the transmit power control amount correction unit 306 may correct a transmit power control amount input from the transmit power control amount obtaining unit 301.

(Operations)

Figure 9:
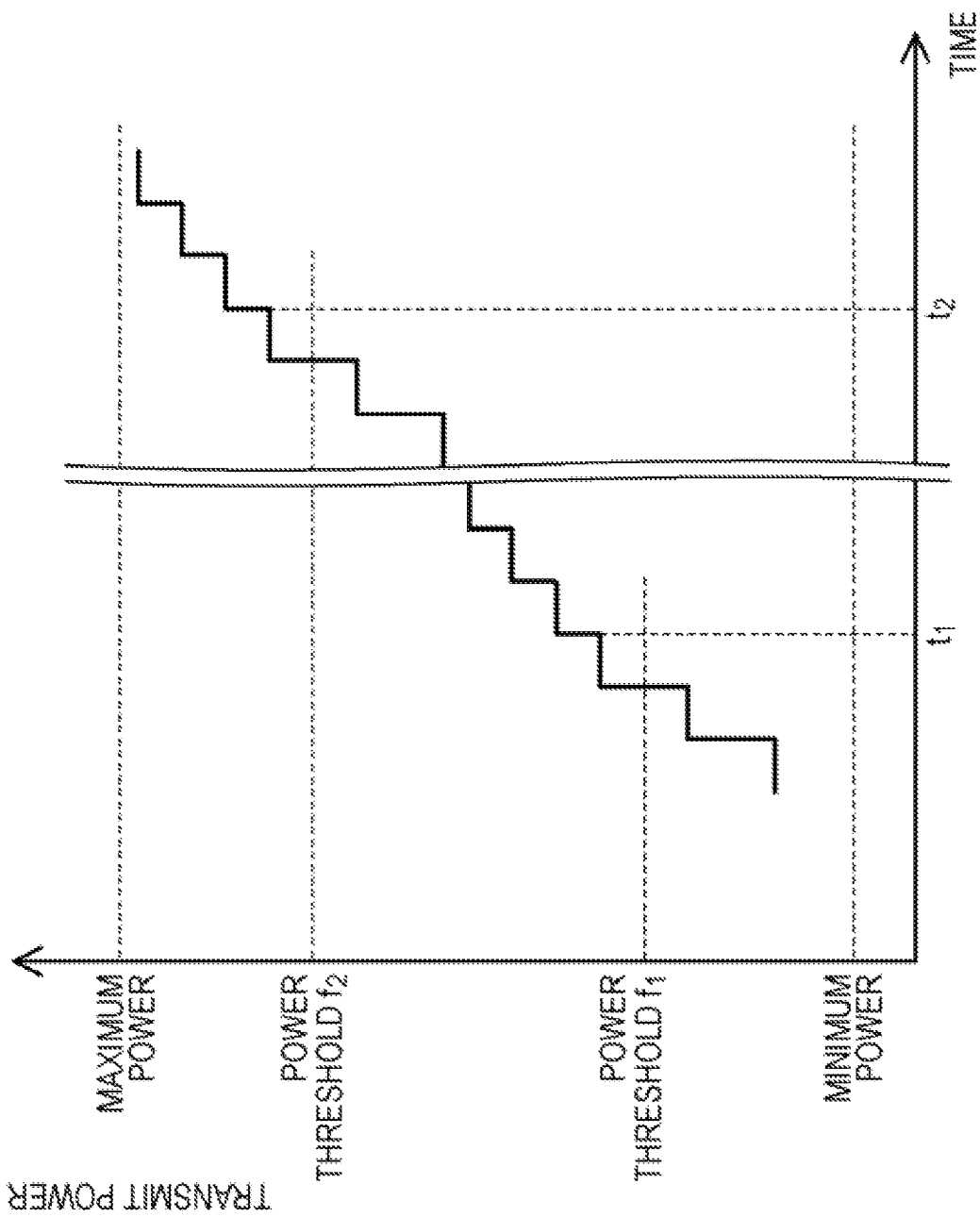
FIG. 9 is a diagram illustrating an example of variations in a power threshold determined by a transmit power control unit, according to an embodiment.

Operations of the wireless communication system 1 will be described with reference to FIG. 9 to FIG. 11.

Upon each passage of the decision cycle mentioned above, the wireless device 20 determines a power threshold based on TA information. For example, as illustrated in FIG. 9, the case where a TA value contained in TA information obtained by the wireless device 20 at a point in time $t_1$ is smaller than a TA value contained in TA information obtained by the wireless device 20 at a point in time $t_2$ is assumed.

In this case, a power threshold h determined by the wireless device 20 at the point in time $t_1$ is smaller than a power threshold $f_2$ determined by the wireless device 20 at the point in time $t_2$. In the example, power thresholds are smaller than the maximum power and larger than the minimum power. The maximum power is the maximum value of transmit power in the wireless device 20. The minimum power is the minimum value of transmit power in the wireless device 20.

Figure 10:
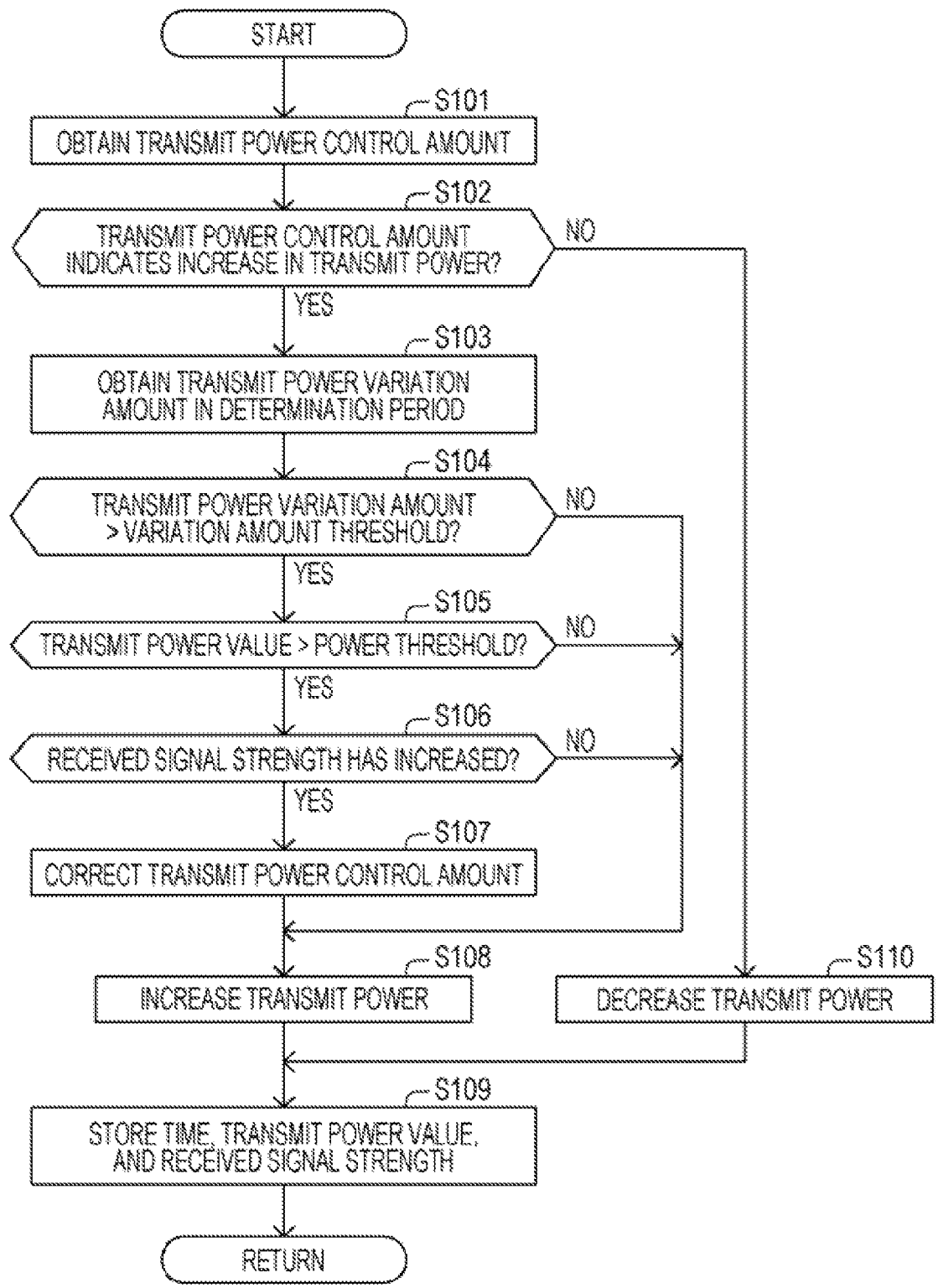
FIG. 10 is a diagram illustrating an example of an operational flowchart for a process performed by a transmit power control unit, according to an embodiment.

Additionally, each time a subframe is received, the wireless device 20 performs a process illustrated in FIG. 10 for the received subframe. In the example, the wireless device 20 obtains a TPC value contained in a TPC command obtained by the demodulation unit 222 and obtains a transmit power control amount based on the obtained TPC value (step S101 in FIG. 10).

Subsequently, the wireless device 20 determines whether or not the obtained transmit power control amount indicates an increase in transmit power (step S102 in FIG. 10). In the example, the wireless device 20 determines that the transmit power control amount indicates an increase in transmit power when the obtained transmit power control amount has a positive value.

Here, the case where the TPC value is "1" (in other words, the transmit power control amount is "+1 dBm") is assumed. In this case, the wireless device 20 determines "Yes" and obtains a transmit power variation amount in a determination period (step S103 in FIG. 10). Subsequently, the wireless device 20 determines whether or not the obtained transmit power variation amount is larger than the variation amount threshold (step S104 in FIG. 10).

Here, the case where the transmit power variation amount is larger than the variation amount threshold is assumed. In this case, the wireless device 20 determines "Yes" and determines whether or not the transmit power value at the current point in time is larger than the latest one of the determined power thresholds (step S105 in FIG. 10).

Here, the case where the transmit power value at the current point in time is larger than the latest one of the determined power thresholds is assumed. In this case, the wireless device 20 determines "Yes" and determines whether or not a received signal strength detected by the search unit 221 has increased in the determination period (step S106 in FIG. 10).

Here, the case where the received signal strength has increased in the determination period is assumed. In this case, the wireless device 20 determines "Yes" and corrects the transmit power control amount obtained in step S101 (step S107 in FIG. 10). In the example, the wireless device 20 corrects the transmit power control amount to a value calculated by multiplying the transmit power control amount obtained in step S101 by the correction coefficient.

Subsequently, the wireless device 20 adds the transmit power control amount (here, the corrected control amount) to the transmit power value at the current point in time to determine a value as a transmit power value, and controls the transmit power of a wireless signal to be transmitted to the base station to so that the transmit power has the same value as the determined transmit power value. In other words, the wireless device 20 varies the transmit power (here, increases the transmit power) of the wireless signal by the corrected control amount (step S108 in FIG. 10).

Subsequently, the wireless device 20 stores a current time, the transmit power value determined in step S108, and the latest value of the received signal strength detected by the search unit 221 in association with one another (step S109 in FIG. 10). Then, the wireless device 20 completes the process illustrated in FIG. 10.

Next, the case where the transmit power variation amount is smaller than or equal to the variation amount threshold is assumed. In this case, the wireless device 20 determines "No" in step S104, does not correct the transmit power control amount, and proceeds to step S108. Accordingly, in this case, the wireless device 20 adds the transmit power control amount (here, the instructed control amount) to the transmit power value at the current point in time to determine a value as a transmit power value, and controls the transmit power of a wireless signal to be transmitted to the base station 10 so that the transmit power has the same value as the determined transmit power value. In other worlds, the wireless device 20 varies the transmit power (here, increases the transmit power) of the wireless signal by the instructed control amount (step S108 in FIG. 10). Subsequently, the wireless device 20 performs the process in step S109 and then completes the process illustrated in FIG. 10.

Next, the case where the transmit power value at the current point in time is smaller than or equal to the latest one of the determined power thresholds is assumed. In this case, the wireless device 20 determines "No" in step S105, does not correct the transmit power control amount, and proceeds to step S108. Accordingly, in this case, the wireless device 20 adds the transmit power control amount (here, the instructed control amount) to the transmit power value at the current point in time to determine a value as a transmit power value, and controls the transmit power of a wireless signal to be transmitted to the base station 10 so that the transmit power has the same value as the determined transmit power value. In other words, the wireless device 20 varies (here, increases) the transmit power of a wireless signal by the instructed control amount (step S108 in FIG. 10). Subsequently, the wireless device 20 performs the process in step S109 and then completes the process illustrated in FIG. 10.

Next, the case where the received signal strength has not increased in the determination period is assumed. In this case, the wireless device 20 determines "No" in step S106, does not correct the transmit power control amount, and proceeds to step S108. Accordingly, in this case, the wireless device 20 adds the transmit power control amount (here, the instructed control amount) to the transmit power value at the current point in time to determine a value as a transmit power value, and controls the transmit power of a wireless signal to be transmitted to the base station 10 so that the transmit power has the same value as the determined transmit power value. In other words, the wireless device 20 varies (here, increases) the transmit power of a wireless signal by the instructed control amount (step S108 in FIG. 10). Subsequently, the wireless device 20 performs the process in step S109 and then completes the process illustrated in FIG. 10.

Next, the case where the TPC value is "0" (in other words, the transmit power control amount is "−1 dBm") is assumed. In this case, the wireless device 20 determines "No" in step S102 and proceeds to step S110. Then, the wireless device 20 adds the transmit power control amount (here, the instructed control amount) to the transmit power value at the current pint in time to determine a value as a transmit power value, and controls the transmit power of a wireless signal to be transmitted to the base station 10 so that the transmit power has the same value as the determined transmit power value. In other words, the wireless device 20 varies (here, decreases) the transmit power of a wireless signal by the instructed control value (step S110 in FIG. 10).

Subsequently, the wireless device 20 stores a current time, the transmit power value determined in step S110, and the latest value of the received signal strength detected by the search unit 221 in association with one another (step S109 in FIG. 10). Then, the wireless device 20 completes the process illustrated in FIG. 10.

Figure 11:
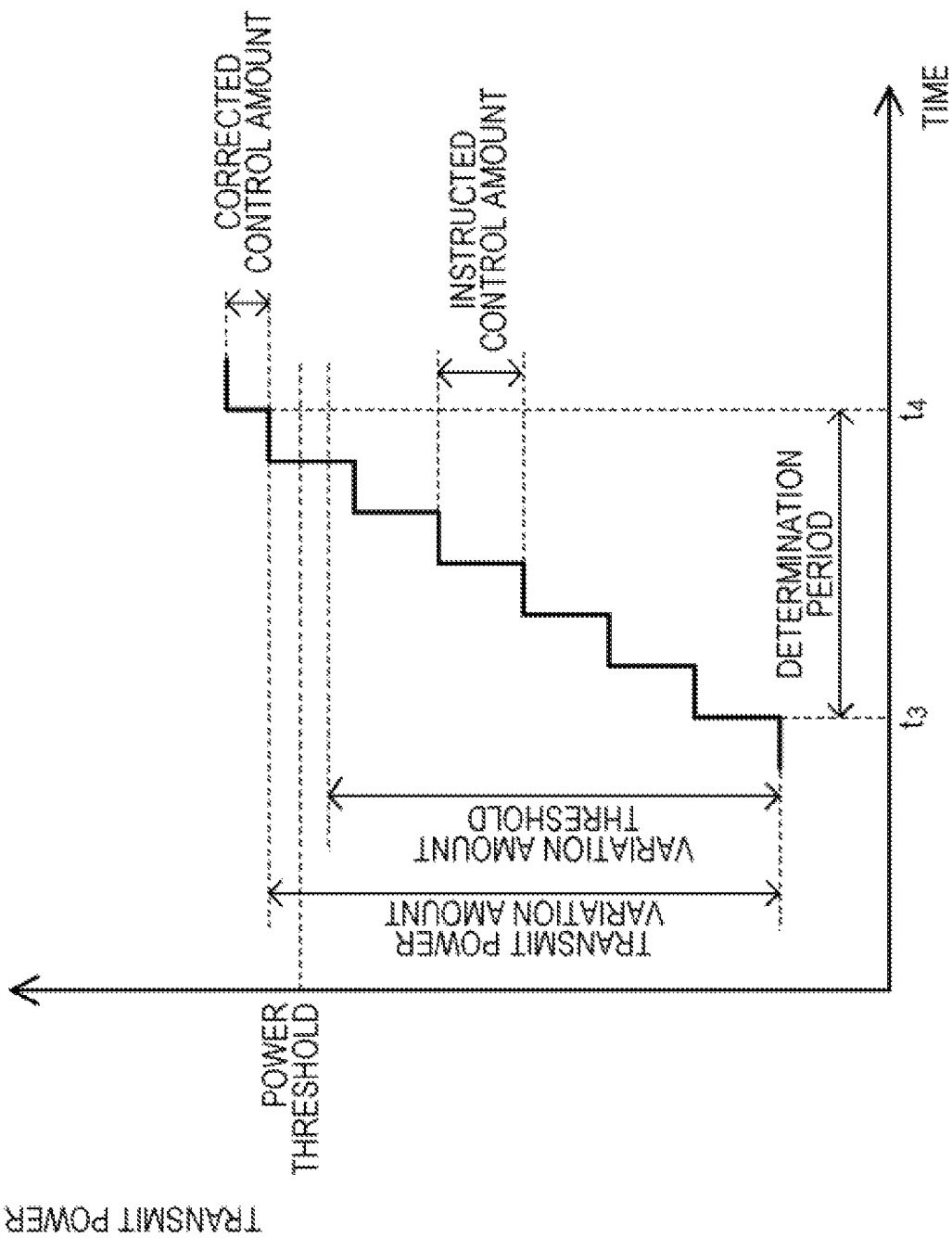
FIG. 11 is a diagram illustrating an example of variations in transmit power in a wireless device, according to an embodiment.

Here, as illustrated in FIG. 11, the case where the wireless device 20 is continuously receiving a TPC command that instructs an increase in transmit power is assumed. In this case, a situation where the second and third conditions mentioned above are not met at a point in time prior to a point in time $t_4$, and the second and third conditions mentioned above are met at the point in time $t_4$ is assumed. A point in time $t_3$ is a point in time that precedes the point in time $t_4$ by a period of time for determination. Consequently, the period from the point in time $t_3$ to the point in time $t_4$ is the determination period at the point in time $t_4$.

In such a situation, at a point in time preceding the point in time $t_4$, the wireless device 20 does not perform the process in step S107 in FIG. 10 and proceeds to step S108. Accordingly, at a point in time preceding the point in time $t_4$, the wireless device 20 controls the transmit power of a wireless signal to be transmitted to the base station 10 so that the transmit power has the same value as a value calculated by adding an instructed control amount to the transmit power value at the current point in time. In other words, the wireless device 20 varies the transmit power (here, increases the transmit power) of a wireless signal by the instructed control amount.

Then, at the point in time $t_4$, the wireless device 20 performs the process in step S107 in FIG. 10 and then proceeds to step S108. Accordingly, at the point in time $t_4$ the wireless device 20 controls the transmit power of a wireless signal to be transmitted to the base station 10 so that the transmit power has the same value as the value calculated by adding the corrected control amount to the transmit power value at the current point in time. In other words, the wireless device 20 varies the transmit power (here, increases the transmit power) of the wireless signal by the corrected control amount.

Note that the wireless device 20 may perform the process in steps S104 to S106 in any order different from the order illustrated in FIG. 10.

When all the above second to fourth conditions are met at some point in time, the wireless device 20 may correct the transmit power control amount until a given duration has elapsed since that point in time, regardless of whether or not the above second to fourth conditions are met.

As described above, the wireless device 20 according to the embodiment receives transmit power control information from the base station 10, detects the received signal strength of a wireless signal from the base station 10, and, based on the detected received signal strength, corrects a transmit power control amount indicated by the transmit power control information.

Thereby, the transmit power control amount is more quickly corrected than in the case where, based on TA information, the transmit power control amount indicated by transmit power control information is corrected. Accordingly, an increase in transmit power may be suppressed early on. As a result, the power consumption of the wireless device 20 may be reduced.

Furthermore, in the wireless device 20 according to the embodiment, when the detected received signal strength has increased, correcting a transmit power control amount includes decreasing the transmit power control amount indicated by transmit power control information.

The transmit power at which the received signal strength detected by the base station 10 is larger than a given threshold is likely to decrease as the received signal strength detected by the wireless device 20 increases. Accordingly, with the wireless device 20, it is possible to suppress the transmit power of the wireless device 20 while sufficiently increasing the received signal strength detected by the base station 10. As a result, the power consumption of the wireless device 20 may be reduced.

Furthermore, in the wireless device 20 according to the embodiment, when the transmit power is larger than a predetermined power threshold, correcting a transmit power control amount includes decreasing a transmit power control amount indicated by transmit power control information.

Thereby, it is possible to inhibit the transmit power of the wireless device 20 from becoming excessive. As a result the power consumption of the wireless device 20 may be reduced.

Furthermore, in the wireless device 20 according to the embodiment, the power threshold decreases as a period of time taken for a wireless signal propagate from the wireless device 20 to the base station 10 decreases.

As the period of time taken for a wireless signal propagate from the wireless device 20 to the base station 10 decreases, the received signal strength detected by the base station 10 is likely to increase. Therefore, the transmit power at which the received signal strength detected by the base station 10 is larger than a given threshold is likely to decrease as the above period of time decreases. Accordingly, with the wireless device 20, it is possible to suppress the transmit power of the wireless device 20 while sufficiently increasing the received signal strength detected by the base station 10. As a result, the power consumption of the wireless device 20 may be reduced.

Furthermore, in the wireless device 20 according to the embodiment, the power threshold is set in accordance with transmit timing control information transmitted by the base station 10.

The transmission timing control information exactly indicates a period of time taken for a wireless signal propagate from the wireless device 20 to the base station 10. Accordingly, with the wireless device 20, the power threshold may be suitably set.

Furthermore, in the wireless device 20 according to the embodiment, when the amount of an increase in transmit power in a given determination period is larger than a predetermined variation amount threshold, correcting a transmit power control amount includes decreasing a transmit power control amount indicated by transmit power control information.

Thereby, when the transmit power of the wireless device 20 is rapidly increasing, the transmit power control amount is corrected to a value smaller then the transmit power control amount indicated by transmit power control information. Accordingly, a rapid increase in transmit power of the wireless device 20 may be suppressed. As a result, the power consumption of the wireless device 20 may be reduced.

Note that, in the embodiment, correction of a transmit power control amount is applied to transmit power control information from the base station 10 to the wireless device 20. When the wireless devices 20 directly communicate with each other, the correction of a transmit power control amount described above may be applied to transmit power control information from a wireless device 20-$j$ to the wireless device 20-$n$. The direct communication between the wireless devices 20 may be referred to as device-to-device (D2D) communication. Here, j denotes an integer different from n among integers from one to N.

For example, the wireless device 20-$n$ may receive transmit power control information from another wireless device 20-$j$, detect the received signal strength of a wireless signal from the other wireless device 20-$j$, and, based on the detected received signal strength, correct a transmit power control amount indicated by the transmit power control information from the other wireless device 20-$j$.

In addition, in the embodiment, a transmit power control amount is corrected basal on a received signal strength. Note that there may be provided a period during which a transmit power control amount is corrected based on a received signal strength and a period during which the transmit power control amount is corrected based on a TA value. In this case, in the period during which a transmit power control amount is corrected based on a TA value, the wireless device 20 may use, as the fourth condition, a condition that a TA value has decreased in the determination period.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless device comprising:
   a processor configured to:
   receive transmit power control information from a base station;
   detect a received signal strength of a wireless signal from the base station;
   determine whether the received signal strength has increased during a determination period; and based on the detected received signal strength, perform a correction process on a transmit power control amount indicated by the transmit power control information and generate a corrected transmit power control amount, wherein the processor adjusts a transmit power of an uplink signal by the corrected transmit power control amount generated by the wireless device when the detected received signal strength increased during the determination period.

2. The wireless device of claim 1, wherein
the correction process includes decreasing the transmit power control amount indicated by the transmit power control information when the detected received signal strength has increased.

3. The wireless device of claim 2, wherein
the correction process includes decreasing the transmit power control amount indicated by the transmit power control information when the transmit power is larger than a predetermined power threshold.

4. The wireless device of claim 3, wherein
the power threshold decreases as a period of time taken for a wireless signal to propagate from the wireless device to the base station decreases.

5. The wireless device of claim 3, wherein
the power threshold is set based on transmission timing control information transmitted by the base station.

6. The wireless device of claim 2, wherein
the correction process includes decreasing the transmit power control amount indicated by the transmit power control information when an increased amount of the transmit power in a given determination period is larger than a predetermined variation amount threshold.

7. The wireless device of claim 1, wherein
the transmit power control information is obtained by reception of a wireless signal from the base station and demodulation of the received signal.

8. A transmit power control method comprising:
receiving transmit power control information from a base station;
detecting a received signal strength from the base station;
determining whether the received signal strength has increased during a determination period;
based on the detected received signal strength, performing a correction process on a transmit power control amount indicated by the transmit power control information and generate a corrected transmit power control amount; and
adjusting a transmit power of an uplink signal by the corrected transmit power control amount generated when the detected received signal strength increased during the determination period.

9. The transmit power control method of claim 8, wherein
the correction process includes decreasing the transmit power control amount indicated by the transmit power control information when the detected received signal strength has increased.

* * * * *